United States Patent
Ozawa et al.

[11] Patent Number: 5,380,571
[45] Date of Patent: Jan. 10, 1995

[54] THERMOPLASTIC ELASTOMER HOSE HAVING EXCELLENT FLEXIBILITY

[75] Inventors: Osamu Ozawa; Hiroyuki Miyade; Tetsu Kitami, all of Hiratsuka, Japan

[73] Assignee: The Yokohama Rubber Co., Ltd., Tokyo, Japan

[21] Appl. No.: 77,638

[22] Filed: Jun. 17, 1993

[30] Foreign Application Priority Data

Jun. 19, 1992 [JP] Japan ................... 4-160724
May 13, 1993 [JP] Japan ................... 5-111354

[51] Int. Cl.⁶ .................................... F16L 11/08
[52] U.S. Cl. .............................. 428/36.9; 428/36.91; 428/36.8; 428/36.1; 428/36.3; 138/137; 138/124; 138/177; 138/DIG. 7
[58] Field of Search .......... 428/36.8, 36.91, 327, 428/36.1, 36.3; 138/137, 177, DIG. 7, 124

[56] References Cited

U.S. PATENT DOCUMENTS

| | | | |
|---|---|---|---|
| 4,881,576 | 11/1989 | Kitami et al. | 138/125 |
| 4,905,734 | 3/1990 | Ito | 138/126 |
| 4,965,111 | 10/1990 | Pratt et al. | 428/36.8 |
| 4,987,017 | 1/1991 | Sato et al. | 428/36.8 |
| 5,068,137 | 11/1991 | Ozawa et al. | 428/36.2 |
| 5,077,108 | 12/1991 | Ozawa et al. | 428/36.2 |
| 5,264,262 | 11/1993 | Igarashi | 428/36.9 |

*Primary Examiner*—Ellis P. Robinson
*Assistant Examiner*—Michael A. Williamson
*Attorney, Agent, or Firm*—Finnegan, Henderson, Farabow, Garrett & Dunner

[57] ABSTRACT

A hose including at least an inner tube, a reinforcing layer and an outer cover, wherein the inner tube and the outer cover are individually composed of a thermoplastic elastomer comprising a vulcanized rubber dispersed in a thermoplastic resin, $M_p$ defined by the following formula (I) is not greater than 70 kgf/cm², and flexural rigidity of the hose at a bending radius four times the outer diameter of the hose is 1 kgf or less:

$$M_p = \frac{t_1}{t_1+t_2} \times M_1 + \frac{t_2}{t_1+t_2} \times M_2 \qquad (I)$$

wherein $t_1$ and $t_2$ are the thickness of the inner tube and the outer tube (mm), respectively, and $M_1$ and $M_2$ are stress (kgf/cm²) at 25% elongation of the inner tube and the outer cover, respectively.

6 Claims, 2 Drawing Sheets

THERMOPLASTIC ELASTOMER HOSE HAVING EXCELLENT FLEXIBILITY

BACKGROUND OF THE INVENTION

1. Field of the Invention

The present invention relates to a thermoplastic elastomer hose having excellent flexibility.

2. Description of the Related Art

Rubber hoses in general comprise an inner tube, a reinforcing layer and an outer cover, and the inner tube and the outer cover are composed of a vulcanized rubber. However, such rubber hoses have disadvantages in that the production process is complicated and troublesome because they require a vulcanization process.

On the other hand, so-called "resin hoses" are known in the art. The resin hoses comprises inner tubes and outer covers composed of a thermoplastic resin and can be produced by a simple production process, in which a vulcanization process is not required. However, thermoplastic resins constituting such resin hoses are generally harder than a vulcanized rubber, and therefore, it has been difficult to obtain soft and flexible hoses.

To improve the flexibility of thermoplastic resins, a resin hose composed of a polyester thermoplastic elastomer using polybutylene terephthalate as a hard segment and polytetramethylene glycol or polycaprolactam as a soft segment for the inner tube is also known. However, there is a limitation to the reduction of the hardness of the polyester thermoplastic elastomer so as to secure the heat-resistance and to exhibit the strength characteristics. For this reason, hoses having sufficient flexibility comparable to that of rubber hoses have not yet been obtained.

Accordingly, there are needs in the development of hoses, which can be produced by a simple production process not requiring the vulcanization process, which have sufficient flexibility and moreover, which have sufficient heat-resistance to withstand application at a high temperature such as pressure transmission and fluid transportation.

SUMMARY OF THE INVENTION

Accordingly, the objects of the present invention are to eliminate the above-mentioned disadvantageous of the conventional hoses and to provide a hose having flexibility equivalent to that of a conventional vulcanized rubber hose, while maintaining the simpleness and ease of a production process of a conventional resin hose, and having, in addition to flexibility, such a high heat-resistance that the hose can be utilized at a high temperature of 120° C. or more.

Other objects and advantages of the present invention will be apparent from the following description.

In accordance with a first embodiment of the present invention, there is provided a hose comprising at least an inner tube, a reinforcing layer and an outer cover, wherein (i) the inner tube and the outer cover are individually composed of a thermoplastic elastomer comprising a thermoplastic resin having a dispersed vulcanized rubber therein, (ii) $M_p$ defined by the following formula (I) is not greater than 70 kgf/cm², and (iii) the flexural rigidity of the hose at a bending radius of four times of the outer diameter of the hose is not greater than 1 kgf:

$$M_p = \frac{t_1}{t_1 + t_2} \times M_1 + \frac{t_2}{t_1 + t_2} \times M_2 \tag{I}$$

wherein $t_1$ and $t_2$ are the thickness (mm) of the inner tube and the outer cover, respectively, and $M_1$ and $M_2$ are stress (kgf/cm²) at 25% elongation (i.e., 25% modulus) of the inner tube and the outer cover, respectively.

In accordance with a second embodiment of the present invention, there is provided a hose comprising at least an inner tube, a reinforcing layer and an outer cover, wherein (i) the inner tube is composed of a thermoplastic elastomer comprising a polyester thermoplastic resin having a dispersed vulcanized rubber composition of an acryl group-containing rubber therein and (ii) the outer cover is composed of a thermoplastic elastomer comprising a thermoplastic resin having a dispersed vulcanized rubber therein, (iii) $M_p$ defined by the above formula (I) is not greater than 70 kgf/cm², and (iv) the flexural rigidity of the hose at a bending radius of four times of the outer diameter of the hose is not greater than 1 kgf.

BRIEF DESCRIPTION OF THE DRAWINGS

The present invention will be better understood from the description set forth below with reference to the accompanying drawings, wherein.

DESCRIPTION OF THE PREFERRED EMBODIMENTS

Figure 1:
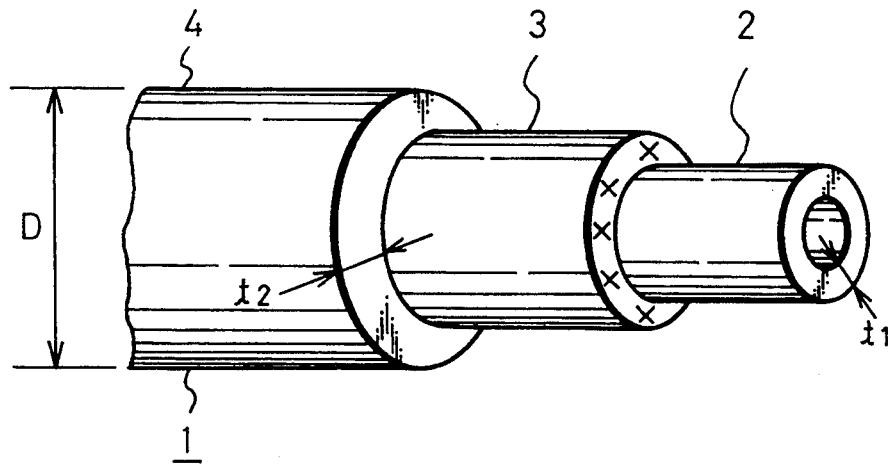
FIG. 1 is a drawing illustrating the structure of the hose according to the present invention.

In order to accomplish the object described above, the inventor of the present invention has carried out studies and has come to realize the use of thermoplastic elastomers having specific structures, properties, compositions, and so forth, in combination with one another, as raw materials that constitute inner and outer tubes. The present invention was completed on the basis of this technical concept.

The important requirement in the first embodiment of the present invention is that the inner tube and the outer cover of the hose should be composed of the combination of thermoplastic elastomers so that $M_p$ of the above-mentioned relational formula (I) between the stress of the outer cover and the inner tube at 25% elongation (25% modulus), and their thickness, is 70 kgf/cm² or less and more preferably, from 5 kgf/cm² to 50 kgf/cm². As a result, there can be obtained a hose having both excellent flexibility and strength.

A hose having excellent flexibility cannot be obtained by the combination of the thermoplastic elastomers the $M_p$ value of which exceeds 70 kgf/cm² according to the relational formula (I) between the stress at 25% elongation (25% modulus) and the thickness, and the flexural rigidity of the hose at a bending radius of four times of the outer diameter of the hose exceeds 1 kgf. When the $M_p$ value is less than 5 kgf/cm², the hose is inferior in strength.

Incidentally, the stress at 25% elongation is measured in accordance with a JIS (Japanese Industrial Standard) K6301 low elongation stress test.

In addition to the structure and the properties of the first embodiment of the present invention described above, the important requirement in the second embodiment of the present invention resides in the composition of the thermoplastic elastomers that constitute the inner tube and the outer cover of the present hose.

In other words, a thermoplastic elastomer prepared by dispersing at a suitable volume ratio a vulcanized rubber having a suitable particle size in a thermoplastic resin is utilized for the inner and outer tubes of the hose and particularly, a polyester type thermoplastic resin is used as the thermoplastic resin for the inner tube, while a vulcanized composition of an acryl group-containing rubber is used as a vulcanized rubber component.

The inner tube and the outer cover of the hose are composed of a thermoplastic elastomer comprising a vulcanized rubber dispersed in a thermoplastic resin. Particularly, a polyester thermoplastic resin is used as the thermoplastic resin for the inner tube, and a vulcanized composition of an acryl group-containing rubber is used as a vulcanized rubber component.

When the inner tube and outer cover of the hose are composed of a thermoplastic elastomer comprising a vulcanized rubber dispersed in a thermoplastic resin and having the same properties as in the first embodiment of the present invention, and in addition, the inner tube is particularly composed of the predetermined composition as described above, sufficient flexibility can be obtained and, at the same time, excellent heat-resistance and softness can be obtained by the inner tube having the predetermined composition, so that a hose having both excellent flexibility and heat-resistance can be realized.

The present invention will now be explained in further detail.

As shown in FIG. 1, the hose 1 of the present invention is composed of, as essential constituents, an inner tube 2, a reinforcing layer 3 and an outer cover 4.

The thermoplastic elastomer usable in the present invention will be explained.

The thermoplastic elastomer usable in the present invention should satisfy the following properties.

Namely, in terms of the properties measured in accordance with an ASTM D395 or D412 test method;
(i) The thermoplastic elastomer has a tension set of 160% or less and preferably 150% or less;
(ii) It has a compression permanent set at 120° C. for 72 hours of 50% or less;
(iii) The Young's modulus (initial tensile modulus) as a scale of flexibility is 2,500 kgf/cm$^2$ or less;
(iv) It does not exhibit a yield point; and
(v) It maintains rubber elasticity up to about 120° C.

Thus, the thermoplastic elastomers usable in the present invention are in conformity with the definition relating to the rubber defined in the ASTM Standards V. 28, page 756 (D1566). Since the thermoplastic elastomer usable in the present invention has the properties Items (i) to (v) described above, it has excellent processability and also has the characteristics that vulcanization is not necessary during molding, although it exhibits the same behavior as the vulcanized rubber.

The component constituents of the thermoplastic elastomer usable in the present invention for both of the inner tube materials and the outer cover materials are as follows.

Namely, the thermoplastic elastomer usable in the present invention comprises a blend of a thermoplastic resin in an amount sufficient to provide thermoplasticity to the elastomer, and a rubber, at least a part of which is vulcanized, in an amount sufficient to provide rubber-like flexibility to the elastomer, wherein the thermoplastic resin component forms at least a continuous phase (a matrix phase), and at least the rubber component exists as a discontinuous phase (a dispersion phase) in the continuous phase.

Incidentally, the thermoplastic elastomer may also have a so-called "salami structure" in which the thermoplastic resin is further dispersed in the discontinuous phase (rubber phase), or the like.

The kind of the thermoplastic resin component and the kind of the rubber component in the thermoplastic elastomer usable in the present invention are suitably selected. As already mentioned, the inner tube uses the polyester thermoplastic resin and the vulcanized composition of an acryl group-containing rubber in the second embodiment of the present invention. The blend proportion may be suitably determined, but preferably, a thermoplastic elastomer suitable for the combination of the inner tube and the outer cover of the hose according to the present invention can be obtained, when the weight ratio of the thermoplastic resin to the rubber is from 75/25 to 25/75 and more preferably from 70/30 to 30/70.

As to the form of dispersion, the particle diameter of the rubber forming the discontinuous phase is preferably 50 μm, or less, more preferably 20 μm or less and most preferably, 5 μm or less.

The thermoplastic resin constituting the thermoplastic elastomer usable for the inner tube and outer cover in the first embodiment of the present invention and for the outer cover in the second embodiment may be any conventional thermoplastic resins, and examples of such thermoplastic resins are polyolefin resins such as a polyethylene resin and a polypropylene resin, polyvinyl chloride resins, polyamide resins, polyester resins, and the like.

In the second embodiment of the present invention, a polyester thermoplastic resin is used as the thermoplastic resin for forming the inner tube.

Typical examples of the polyester thermoplastic resins include a polyethylene terephthalate resin, a polybutylene terephthalate resin, and thermoplastic resins and thermoplastic elastomers of block and/or graft copolymers of these resins as the constituent elements.

Particularly preferred is a polyester thermoplastic elastomer because it provides excellent flexibility. More specifically, a copolymer elastomer using polybutylene terephthalate as a hard segment and polytetramethylene glycol and/or polycaprolactam as a soft segment can be cited as a suitable example.

The rubber for constituting the thermoplastic elastomer usable for the inner tube and outer cover in the first embodiment of the present invention and for the outer cover in the second embodiment may be any conventional rubbers, and examples of such rubbers are a natural rubber (NR), a polyisoprene rubber (IR), a butadiene rubber (BR), a styrene-butadiene copolymer rubber (SBR), a butyl type rubber (IIR, Cl-IIR, Br-IIR), a chloroprene rubber (CR), an ethylene-propylene (-diene monomer) copolymer rubber (EPM, EPDM), an acrylonitrile-butadiene copolymer rubber (NBR), a chlorinated polyethylene rubber (CM), a chlorosulfonated polyethylene rubber (CSM), an acrylic rubber (ACM, ANM), an epichlorohydrin rubber (CO, ECO), an ethylene-acrylate type copolymer rubber (AEM), an ethylene-vinyl acetate-acrylate (acrylic ester) ternary copolymer rubber (ER), a hydrogenated acrylonitrile-butadiene copolymer (HNBR), and the like.

On the other hand, an acryl group-containing rubber is used as the rubber constituting the thermoplastic elastomer for the inner tube in the second embodiment of the present invention.

Examples of the acryl group-containing rubber are an acryl rubber, an ethylene-acrylate copolymer rubber, an ethylene-vinyl acetate-acrylate ternary copolymer rubber, and the like. The term "acryl group-containing rubber" usable in the second embodiment of the present invention includes those rubbers which are obtained by copolymerizing monomers consisting of acrylic compounds having a vulcanizable group on the main chain and/or side chain thereof, glycidyl ethers, and the like.

Two or more kinds of these resins and rubbers may be used in combination.

The constituent components of the thermoplastic elastomer usable in the present invention are the above-mentioned thermoplastic resin and the above-mentioned rubber, and in such a thermoplastic elastomer, at least a part of the rubber component constituting the elastomer is vulcanized.

The above-mentioned thermoplastic elastomer can be produced by the steps of keeping the molten products of the resin and rubber described above inside a Banbury mixer, a Blabender mixer or a certain kind of kneader-/extruder (co-/counter-rotating extruder), finely kneading and dispersing the rubber phase, adding further a vulcanizing agent and masticating the mixture at a temperature which promotes vulcanization, until vulcanization of the rubber phase is completed.

Thus, the thermoplastic elastomer usable in the present invention is produced by causing vulcanization of the rubber phase, while carrying out mastication, i.e., dynamic cure which dynamically carries out vulcanization or dynamic vulcanization.

The above-mentioned thermoplastic elastomer is also referred to as a "dynamically vulcanized rubber" or a "dynamically vulcanized thermoplastic rubber" due to its characterizing feature in production, dynamic heat-treatment.

Due to the production process, the resulting thermoplastic elastomer exhibits the same behavior as the vulcanized rubber, and since at least the continuous phase consists of tile resin phase, processing equivalent to the thermoplastic resin can be used during molding and processing of the thermoplastic elastomer.

During the production of such a dynamically vulcanized rubber, the vulcanization system of the rubber may be any conventional system so long as it can vulcanize the rubber, but it is preferred to use a sulfur-based vulcanizing agent when the rubber is NR, IR, BR or SBR, a resin-based, a sulfur-based or a metal oxide-based vulcanizing agent for IIR, Cl-IIR or Br-IIR, a sulfur-based, a metal oxide-based or a thiourea-based vulcanizing agent for CR, a sulfur-based vulcanizing agent for EPDM, an organic peroxide-based vulcanizing agent for EPM, a sulfur-based or a metal oxide-based vulcanizing agent for NBR, a thiourea-based, a triazinethiol-based or an organic peroxide-based vulcanizing agent for CM, a sulfur-based or a metal oxide-based vulcanizing agent for CSM, a polyfunctional amine-based or a triazinethiol-based vulcanizing agent for ACM or ANM, a metal oxide-based vulcanizing agent for CO or ECO, a polyfunctional amine-based, an imidazole or a triazinethiol-based vulcanizing agent for AEM, an imidazole-based or triazinethiol-based vulcanizing agent for ER and a sulfur-based, a metal oxide-based or an organic peroxide-based vulcanizing agent for HNBR.

The hose 1 according to the present invention comprises the inner tube 2, the reinforcing layer 3 and the outer cover 4, as shown in FIG. 1. The reinforcing layer 4 is not limited, ill particular, and may be a layer of a braiding or spiraling (or knitting) of yarns of a vinylon fiber, a rayon fiber, a polyester fiber, a polyamide (e.x. Nylon) fiber, an aromatic polyamide fiber, etc., or hard steel wires, in the same manner as the reinforcing layer of the hose according to the prior art.

Preferably, the inner tube 2 of the hose 1 according to the present invention has an inner diameter of 3 to 30 mm, a thickness of 0.5 to 4.0 mm and an outer diameter of 4 to 40 mm, although this is not a limitation.

On the other hand, the outer cover of the hose has an inner diameter of 4 to 40 mm, a thickness of 0.5 to 4.0 mm and an outer diameter of 5 to 50 mm.

The hose of the present invention can be produced easily by a method per se well known in the art, that is, by extrusion molding of the thermoplastic elastomer.

The stress at 25% elongation (i.e., 25% modulus) of the inner tube and outer cover of the hose thus produced is the important requirement for the first and second embodiments of the present invention. Although this stress is not particularly limited, the stress at 25% elongation of the inner tube is generally preferably from 5 to 100 kgf/cm$^2$ and that of the outer cover is from 5 to 80 kgf/cm$^2$.

The inner tube 2 and the outer cover 4 of the hose 1 according to the present invention are composed of the combination of the thermoplastic elastomers which provide the $M_p$ value of 70 kgf/cm$^2$ or less in the following relational formula (I) between the stress and the thickness of the inner tube and outer cover of the hose of the present invention at their 25% elongation, as already mentioned above.

$$M_p = \frac{t_1}{t_1 + t_2} \times M_1 + \frac{t_2}{t_1 + t_2} \times M_2 \tag{I}$$

wherein $t_1$ and $t_2$ are the thickness (mm) of the inner tube and the outer tube (see FIG. 1), respectively, and $M_1$ and $M_2$ are the stress (kgf/cm$^2$) at 25% elongation of the inner tube and the outer cover, respectively.

When the inner tube and/or the outer cover of the hose according to the present invention is a multi-layered tube, the sum of the values of proportions (fractions) of the thickness of a material occupying the thickness of the multi-layered tube and added to the stress at 25% elongation of the multi-layered tube or to the stress at 25% elongation of each material constituting the multi-layered tube, or in other words, $M_i$ defined by the following formula (II), may be used as $M_1$ and $M_2$ of the formula (I) mentioned above:

$$M_i \text{ (where } i = 1, 2) = \frac{t_{i1}}{t_{i1} + t_{i2} \cdots} \times M_{i1} + \frac{t_{i2}}{t_{i1} + t_{i2} \cdots} \times M_{i2} + \ldots = \sum_{j=1}^{n} \frac{t_{ij}}{\sum_{j=1}^{} t_{ij}} \times M_{ij} \tag{II}$$

wherein $t_1$ is the thickness of the layer (mm) constituting the inner tube or the outer tube, $M_i$ is the stress (kgf/cm$^2$) at 25% elongation of the layer constituting the inner tube or the outer cover, and j represents an each component of the multi-layered tube.

The hose 1 according to the present invention has flexibility, and the flexural rigidity thereof is 1 kgf or less and preferably 0.8 kgf or less, at a bending radius which is four times the outer diameter D of the hose 1. When the flexural rigidity is more than 1 kgf, the hose is inferior in flexibility, and is out of the scope of the present invention.

The hose of the present invention having such properties can be obtained by using the thermoplastic elastomers having the above-mentioned properties as the materials of the inner and outer tubes.

The hose according to the present invention is as flexible as the hose consisting of the vulcanized rubber, and can be used for the same application as that of the vulcanized rubber hose. In the second embodiment of the present invention, in particular, the hose has excellent heat-resistance in addition to flexibility.

In the first embodiment of the present invention, the kind of the vulcanized rubber component of the thermoplastic elastomer is preferably selected appropriately in accordance with the properties of an internal fluid of the hose.

For example, in the first embodiment of the present invention, when the inner tube comes into contact with a mineral oil type operating (or hydraulic) oil such as in the case of a hydraulic hose, a vulcanized product of a nitrile rubber such as NBR is preferably used as the vulcanized rubber component of the thermoplastic elastomer constituting the inner tube of the present hose so as to improve the oil resistance.

The kind of the thermoplastic elastomer constituting the inner tube and outer cover of the present hose may be varied, as well, depending on the applications of the hose, and any conventional additives such as a filler, a stabilizer, a colorant, and the like, can be optionally blended.

EXAMPLES

The present invention will now be further illustrated by, but is by no means limited to, the following Examples.

Example 1

Hoses according to the first embodiment of the present invention (Examples 1 to 6) and hoses according to the prior art (Comparative Examples 1 to 3) were produced by using the materials listed in Table 1 for the inner tube, the outer cover and the reinforcing layer, according to the method mentioned below.

Production Method of Hose (1) Extrusion of inner tube:
The inner tube material was extruded to a predetermined thickness onto a Nylon 6 mandrel having 6.0 mm$\Phi$ by a resin extruder to form the inner tube.

(2) Braiding of reinforcing layer:
After coating a room temperature setting-type urethane adhesive on the inner tube, a predetermined reinforcing fiber layer was formed by a braiding machine.

(3) Extrusion of outer tube:
After coating the room temperature setting-type urethane adhesive on the reinforcing layer, the outer cover material was extruded to a predetermined thickness by the resin extruder to form the outer cover.

Flexural rigidity of each of various kinds of hoses produced in this manner was measured (at a bending radius four times the outer diameter of the hose).

Separately, sheets of the inner tube material and the outer cover material were produced, and the stress at their 25% elongation was measured (in accordance with JIS (Japanese Industrial Standard) K6301 low elongation stress test).

The $M_p$ value of each sample hose was calculated from the stress at 25% elongation (25% modulus) of the inner tube and outer cover materials and from the thickness of the inner tube and outer cover of the sample hose. The results are shown in Table 1.

TABLE 1

|  |  | Comparative Example 1 | Comparative Example 2 | Comparative Example 3 | Example 1 | Example 2 |
| --- | --- | --- | --- | --- | --- | --- |
| Inner tube | Material | Hitrel 5557*2 | Hitrel 4767 | Hitrel 4767 | GEOLAST 703-40*2 | GEOLAST 703-40 |
|  | $M_1$ (kgf/cm$^2$) | 190 | 100 | 100 | 40 | 40 |
|  | $t_1$ (mm) | 1.0 | 1.0 | 1.0 | 1.0 | 1.0 |
| Reinforcing layer |  | polyester | polyester | polyester | polyester | polyester |
| Outer cover | Material | SANTOPRENE 101-73*2 | SANTOPRENE 101-73 | SARLINK 1170*2 | SANTOPRENE 101-73 | SARLINK 1170 |
|  | $M_2$ (kgf/cm$^2$) | 35 | 35 | 23 | 35 | 23 |
|  | $t_2$ (mm) | 0.5 | 0.5 | 0.5 | 0.5 | 0.5 |
| Hose flexural rigidity (kgf/cm$^2$)*1 |  | 1.6 | 1.3 | 1.3 | 0.8 | 0.7 |
| $M_p$ |  | 139 | 79 | 75 | 38 | 34 |

|  |  | Example | | | |
| --- | --- | --- | --- | --- | --- |
|  |  | 3 | 4 | 5 | 6 |
| Inner tube | Material | GEOLAST 701-80 | GEOLAST 701-80 | SARLINK 1170* | SARLINK 1170* |
|  | $M_1$ (kgf/cm$^2$) | 15 | 15 | 23 | 23 |
|  | $t_1$ (mm) | 1.0 | 1.0 | 1.0 | 1.0 |
| Reinforcing layer |  | polyester | polyester | polyester | polyester |
| Outer cover | Material | SANTOPRENE 107-73* | SARLINK 1170* | SANTOPRENE 101-73* | SARLINK 1170* |
|  | $M_2$ (kgf/cm$^2$) | 35 | 23 | 35 | 23 |
|  | $t_2$ (mm) | 0.5 | 0.5 | 0.5 | 0.5 |
| Hose flexural rigidity (kgf/cm$^2$)*1 |  | 0.6 | 0.5 | 0.7 | 0.6 |

TABLE 1-continued

| $M_p$ | 22 | 18 | 27 | 23 |

*1 Bending radius: 4 times the hose outer diameter
*2: see Table 2

The compositions and the properties of the thermoplastic elastomers used are listed in Table 2.

TABLE 2

| Compound name, grade | Manufacturer | Composition Resin | Rubber | M25 (kgf/cm²) |
|---|---|---|---|---|
| GEOLAST 703-40 | AES | PP | NBR | 40 |
| GEOLAST 701-80 | AES | PP | NBR | 15 |
| SARLINK 1170 | DSM | PVC | NBR | 23 |
| SANTOPRENE 101-73 | AES | PP | EPDM | 35 |
| HITREL 5557 | DuPont | TPEE | | 190 |
| HITREL 4767 | DuPont | TPEE | | 100 |

Figure 2:
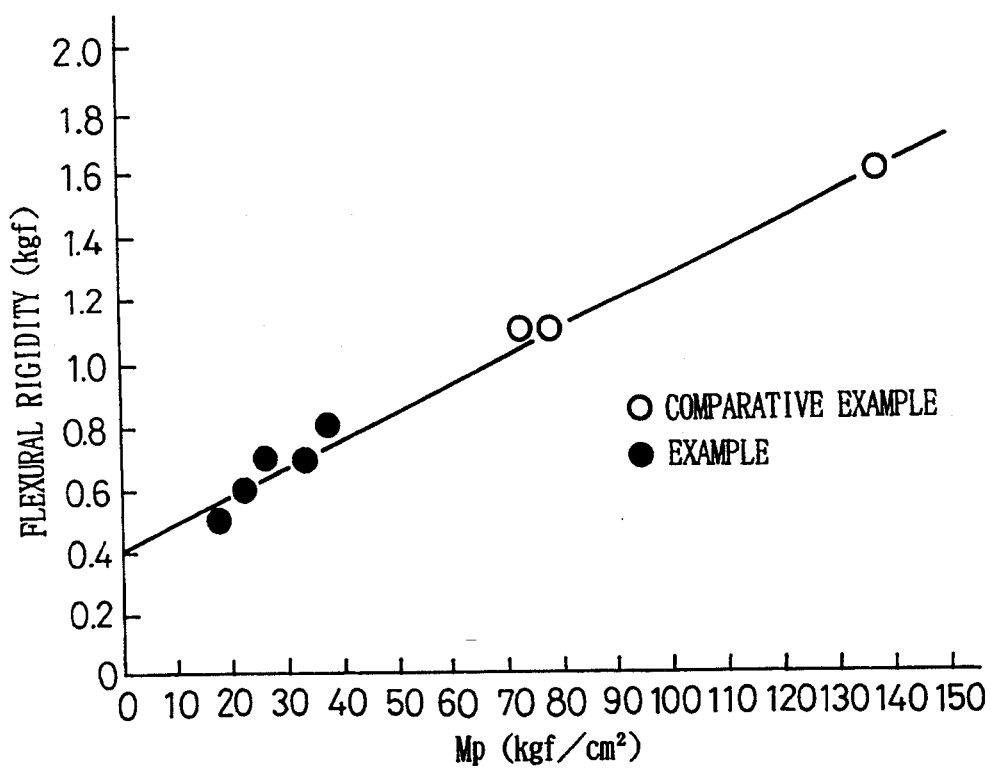
FIG. 2 is a graph showing the relationships between $M_p$ and flexural rigidity of Examples and Comparative Examples.

M25: stress at 25% elongation
(Remarks) Manufacturers:
AES ... available from A.E.S. Japan Co.
DSM ... available from Sanyo Trading K.K. (formerly NOVACOR Co.)
Symbols of the components in Table 2 are as follows.
PP: Polypropylene resin
PVC: Polyvinyl chloride resin
NBR: Acrylonitrile-butadiene copolymer rubber
EPDM: Ethylene-propylene-diene monomer ternary copolymer rubber
TPEE: Thermoplastic polyester elastomer FIG. 2 shows the relation between $M_p$ and flexural rigidity. In FIG. 2, a black circle represents the hoses according to the first embodiment of the present invention (Examples 1 to 6), and a white circle represents the hoses of Comparative Examples (Comparative Examples 1 to 3).

As can be seen from FIG. 2, $M_p$ and flexural rigidity have correlationship and exhibit a linear relation. It can be understood from this line that the $M_p$ value for obtaining flexural rigidity of 1 kgf or less is up to 70 kgf/cm² and the $M_p$ value for obtaining flexural rigidity of 0.8 kgf or less is up to 50 kgf/cm².

Example 2

Hoses according to the second embodiment of the present invention (Examples 7 to 10) were produced in the same manner as in Example 1.

Flexural rigidity at a bending radius four times the hose outer diameter was measured for each of the resulting hoses in the same manner as in Example 1. Further, the sheets of the materials of the inner tube and outer cover were produced, respectively, and the stress at their 25% elongation (25% modulus) was measured to calculate $M_p$ of each of the hoses.

The flexural rigidity test was carried out in the same manner as in Example 1 for each of the hoses according to the second embodiment of the present invention, the hoses of Comparative Examples 1 to 3 and the hoses of Examples 1 and 2 of the present invention, and a destructive test was carried out for each of these hoses at 20°, 100°, 120° and 140° C. in accordance with a JIS K6349 pressure-resistance test (rupture test).

The results are shown in Table 3.

TABLE 3

| | | Comparative Examples | | | Examples | |
|---|---|---|---|---|---|---|
| | | 1 | 2 | 3 | 1 | 2 |
| Inner tube | Material | Hitrel*2 5557 | Hitrel 4767 | Hitrel 4767 | GEOLAST*2 703-40 | GEOLAST 703-40 |
| | $M_1$ (kgf/cm²) | 190 | 100 | 100 | 40 | 40 |
| | $t_1$ (mm) | 1.0 | 1.0 | 1.0 | 1.0 | 1.0 |
| Reinforcing layer | | polyester | polyester | polyester | polyester | polyester |
| Outer cover | Material | SANTOPRENE*2 101-73 | SANTOPRENE 101-73 | SARLINK*2 1170 | SANTOPRENE 101-73 | SARLINK 1170 |
| | $M_2$ (kgf/cm²) | 35 | 35 | 23 | 35 | 23 |
| | $t_2$ (mm) | 0.5 | 0.5 | 0.5 | 0.5 | 0.5 |
| Hose flexural rigidity (kgf/cm²)*1 | | 1.6 | 1.3 | 1.3 | 0.8 | 0.7 |
| $M_p$ | | 139 | 79 | 75 | 38 | 34 |
| Destructive test (kgf/cm²) | 20° C. | 1200 | 1200 | 1200 | 1200 | 1200 |
| | 100° C. | 620 | 620 | 610 | 600 | 600 |
| | 120° C. | 540 | 540 | 530 | 280 | 280 |
| | 140° C. | 450 | 450 | 450 | 160 | 160 |

| | | Examples | | | |
|---|---|---|---|---|---|
| | | 7 | 8 | 9 | 10 |
| Inner tube | Material | ZTPE 1045*2 | ZTPE 1045 | ZTPE 1040 | ZTPE 1040 |
| | $M_1$ (kgf/cm²) | 75 | 75 | 55 | 55 |
| | $t_1$ (mm) | 1.0 | 1.0 | 1.0 | 1.0 |
| Reinforcing layer | | polyester | polyester | polyester | polyester |
| Outer cover | Material | SANTOPRENE 101-73*2 | SARLINK 1170*2 | SANTOPRENE 101-73 | SARLINK 1170 |
| | $M_2$ (kgf/cm²) | 35 | 23 | 35 | 23 |
| | $t_2$ (mm) | 0.5 | 0.5 | 0.5 | 0.5 |
| Hose flexural rigidity (kgf/cm²)*1 | | 0.9 | 0.9 | 0.8 | 0.8 |
| $M_p$ | | 61 | 58 | 48 | 44 |
| Destructive test (kgf/cm²) | 20° C. | 1200 | 1200 | 1200 | 1200 |
| | 100° C. | 610 | 610 | 610 | 610 |
| | 120° C. | 550 | 550 | 540 | 530 |
| | 140° C. | 480 | 470 | 460 | 450 |

*1 Bending radius: 4 times the hose outer diameter
*2: see Table 4

TABLE 4

| Name of product and grade | Manufacturer | Composition Resin | Composition Rubber | $M_{25}$ (kgf/cm$^2$) |
| --- | --- | --- | --- | --- |
| ZTPE 1045 | NZ | TPEE | ACM | 75 |
| ZTPE 1040 | NZ | TPEE | ACM | 55 |
| Htrel 5557 | DuPont | TPEE | | 190 |
| Htrel 4767 | DuPont | TPEE | | 100 |
| GEOLAST 703-40 | AES | PP | NBR | 40 |
| GEOLAST 701-80 | AES | PP | NBR | 15 |
| SANTOPRENE 101-73 | AES | PP | EPDM | 35 |
| SARLINK 1170 | DSM | PVC | NBR | 23 |

M25: Stress at 25% elongation (25% modulus)
NOTE:
Manufacturers:
NZ ... Nippon Zeon K.K.
AES ... available from A.E.S. Japan Co.
DSM ... available from Sanyo Boeki K.K. (formerly NOVACOR Co.)
Symbols of the components in Table 4 are as follows:
PBT: polyethylene terephthalate resin
PP: polypropylene resin
ACM: acrylic rubber
TPEE: thermoplastic polyester elastomer
NBR: acrylonitrile-butadiene copolymer rubber
EPDM: ethylene-propylene-diene monomer ternary copolymer rubber As shown in Table 3, the flexural rigidities of the hoses were higher than 1 kgf in all of Comparative Examples 1 to 3 as the hoses of the prior art, and these hoses could not be said to be hoses having high flexibility.

The hoses of Examples 1 and 2 according to the first embodiment of the present invention were excellent in flexibility. Although these hoses could be applied in this respect to the same application as the hoses of the vulcanized rubber, they had a problem of heat-resistance at a high temperature of 120° C. or above.

The hoses of Examples 7 to 10 according to the second embodiment of the present invention had excellent flexural rigidity of 1 kgf or less and had also excellent strength even at a high temperature of 120° C. or above. It could be understood that these hoses had both excellent flexibility and heat-resistance.

The hose according to the present invention is as flexible as the hose composed of the vulcanized rubber or has higher heat-resistance. Moreover, since the hose according to the present invention can be produced extremely simply and easily, the production cost is lower, and the hose can be utilized for the same application as the hose made of the vulcanized rubber.

We claim:

1. A flexible, high heat resistant hose comprising at least an inner tube, an outer cover, and a reinforcing layer between said inner tube and said outer cover, said inner tube and outer cover each being made from a thermoplastic elastomer comprising a thermoplastic resin having a vulcanized rubber dispersed therein and said hose having a flexural rigidity at a bending radius of four times its outer diameter of not greater than 1 kgf and a $M_p$ value not greater than 70 kgf/cm$^2$ where $$M_p = \frac{t_1}{t_1 + t_2} \times M_1 + \frac{t_2}{t_1 + t_2} \times M_2$$

wherein $t_1$ and $t_2$ are the thickness in mm of the inner tube and the outer cover, respectively, and $M_1$ and $M_2$ are the stress in kgf/cm$^2$ at 25% elongation of the inner tube and the outer cover, respectively.

2. The hose of claim 1, wherein said inner tube is made from a polyester thermoplastic resin having a vulcanized rubber composition of acryl group-containing rubber dispersed therein.

3. The hose of claim 1, wherein said $M_p$ value is from 5 to 50 kgf/cm$^2$.

4. The hose of claim 1, wherein the weight ratio of the thermoplastic resin to the vulcanized rubber is from 75/25 to 25/75.

5. The hose of claim 1, wherein the thermoplastic resin is a polyolefin resin, a polyvinyl chloride resin, a polyamide resin, or a polyester resin.

6. The hose of claim 1, wherein the dispersed vulcanized rubber is present in the form of particles having a size of 50 μm or less.

* * * * *